(12) United States Patent
Choi

(10) Patent No.: US 10,427,454 B2
(45) Date of Patent: Oct. 1, 2019

(54) HUB UNIT HAVING BRAKE DISK

(71) Applicants: HYUNDAI MOTOR COMPANY, Seoul (KR); KIA MOTORS CORPORATION, Seoul (KR)

(72) Inventor: Jungnam Choi, Seongnam-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 183 days.

(21) Appl. No.: 15/603,865

(22) Filed: May 24, 2017

(65) Prior Publication Data
US 2018/0154690 A1    Jun. 7, 2018

(30) Foreign Application Priority Data
Dec. 7, 2016 (KR) .................. 10-2016-0165934

(51) Int. Cl.
| | | |
|---|---|---|
| B60B 27/00 | (2006.01) | |
| F16D 65/12 | (2006.01) | |
| F16D 65/00 | (2006.01) | |
| B62L 1/00 | (2006.01) | |
| B60B 27/02 | (2006.01) | |
| F16D 65/02 | (2006.01) | |

(52) U.S. Cl.
CPC ...... B60B 27/0052 (2013.01); B60B 27/0063 (2013.01); B60B 27/026 (2013.01); B62L 1/005 (2013.01); F16D 65/0062 (2013.01); F16D 65/0068 (2013.01); F16D 65/123 (2013.01); B60B 2900/212 (2013.01); B60B 2900/3312 (2013.01); B62K 2206/00 (2013.01); F16D 2065/1384 (2013.01)

(58) Field of Classification Search
CPC .............. B60B 27/0052; B60B 27/026; B60B 27/0063; B60B 2900/3312; B60B 2900/212; F16D 65/0062; F16D 65/123; F16D 65/0068; F16D 2065/1384; B62L 1/005; B62K 2206/00
USPC .......................................................... 301/68
See application file for complete search history.

(56) References Cited

U.S. PATENT DOCUMENTS

| | | | | |
|---|---|---|---|---|
| 1,990,510 | A * | 2/1935 | Winkler | B62L 5/14 188/251 M |
| 2,572,182 | A * | 10/1951 | Mueller | B62L 5/08 12/146 D |
| 2008/0053719 | A1* | 3/2008 | Yoshino | B60K 7/0007 180/55 |
| 2009/0261648 | A1* | 10/2009 | Cusack | B62K 25/02 301/124.2 |

* cited by examiner

*Primary Examiner* — S. Joseph Morano
*Assistant Examiner* — Jean W Charleston
(74) *Attorney, Agent, or Firm* — Brinks Gilson & Lione

(57) ABSTRACT

The present disclosure provides a hub unit including a fixing shaft disposed along a rotation center shaft; a hub body rotatably disposed at the fixing shaft through a bearing and having space inside; a brake disk fixed in the hub body by a bracket and formed in a circumference direction on a basis of the fixing shaft; a fixing member where one side of which is fixed to the fixing shaft; a caliper formed at the other side of the fixing member and a part of the brake disk is inserted into the caliper; and a brake pad where both inside surfaces of the brake pad are contacted with both side surfaces of the brake disk.

11 Claims, 4 Drawing Sheets

HUB UNIT HAVING BRAKE DISK

CROSS-REFERENCE TO RELATED APPLICATION

Figure 1:
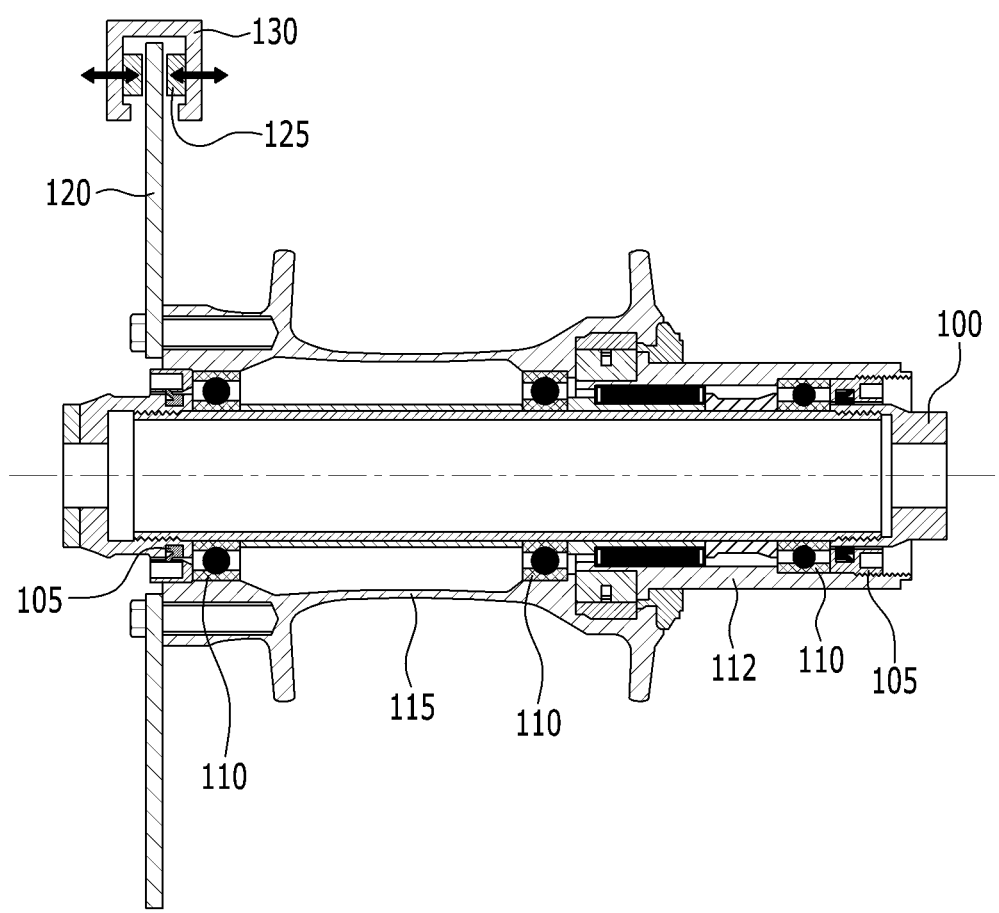

This application claims priority to and the benefit of Korean Patent Application No. 10-2016-0165934, filed on Dec. 7, 2016, which is incorporated herein by reference in its entirety.

FIELD

The present disclosure relates to a hub unit having a brake disk in a hub body of a bicycle.

BACKGROUND

The statements in this section merely provide background information related to the present disclosure and may not constitute prior art.

There are a rim brake type and a brake disk type as types of bicycles.

The rim brake type is a type obtaining braking force by contacting a pad on a rim, and there are caliper brake, cantilever brake and V brake.

The brake disk type is a type obtaining braking force by contacting a pad on a rotor connected with a hub body of a bicycle, and there are mechanical and hydraulic pressure types.

The mechanical type brake disk is a type that a caliper in which a brake pad is installed fixes a disk rotor connected with the hub body by pulling a cable, and the hydraulic pressure type is a type that the caliper fixes the disk rotor to obtain braking force by using hydraulic pressure, not by using the cable.

The brake disk includes a brake handle connected with a bicycle handle bar, a brake cable, a brake lever connected with the brake handle by the brake cable, a caliper fixing a disk connected with a hub body shaft of the bicycle by the brake lever to perform braking motion.

Meanwhile, the disk is disposed at outside of the hub body and may be bent according to braking motion by outside shock. The disk may be sharp to cause fatal injury on human body, and a front wheel of the bicycle generates moment in one direction during braking causing instability of steering.

SUMMARY

The present disclosure has been made in an effort to provide a hub unit having a brake disk which prevents a disk from being bent according to braking motion by outside shock, prevents a fatal injury on human body and eliminates moment generated in one direction during braking of a front wheel.

As describe above, a hub unit having a brake disk according to one form of the present disclosure includes a fixing shaft disposed along a rotation center shaft; a hub body rotatably disposed at the fixing shaft through a bearing and having space inside; a brake disk fixed in the hub body by a bracket and formed in a circumference direction on a basis of the fixing shaft; a fixing member where one side of the fixing member is fixed to the fixing shaft; a caliper formed at the other side of the fixing member where a part of the brake disk is inserted into the caliper; and a brake pad where both inside surfaces of the brake pad are contacted with both side surfaces of the brake disk.

A body expansion may be formed at the hub body where an outer diameter of the body expansion portion is capable of becoming larger and the caliper may be disposed inside the body expansion portion.

One end of the fixing member may be fixed to the fixing shaft, the other end may extend toward outside in a radial direction in the body expansion portion, and the brake disk may be disposed in parallel with the fixing member and extend toward inside of the caliper.

The body expansion portion and the fixing member may be formed at a center portion of the fixing shaft in a longitudinal direction.

A hub unit according to one form of the present disclosure may further include a quick release (OR) inserted along a center shaft of the fixing shaft in a longitudinal direction to fix the fixing shaft at a dropout of a bicycle frame.

A hub unit having a brake disk according to one form of the present disclosure may include a fixing shaft disposed along a rotation center shaft; a first hub body rotatably disposed at one side of the fixing shaft through a bearing; a second hub body rotatably disposed at the other side of the fixing shaft through the bearing in a predetermined interval with the first hub body; a brake disk fixed to an end portion of the second hub body opposing to an end portion of the first hub body and formed in a circumference direction on a basis of the fixing shaft; a fixing member where one end of the fixing member is connected with the fixing shaft and extended in a predetermined distance toward outside in a radial direction between the first hub body and the second hub body; a caliper disposed at an outside end portion of the fixing member where the brake disk is inserted into the caliper; and a brake pad where both inside surfaces of the brake pad are contacted with both side surfaces of the brake disk.

The first hub body may be disposed at one side on a basis of the brake disk and connected with one end portion of a first spoke connected with a rim of a wheel, and the second hub body may be disposed at the other side on a basis of the brake disk and connected with a second spoke connected with the rim of the wheel.

The brake disk may be disposed in parallel with the fixing member and extend toward inside of the caliper.

The hub unit according to one form of the present disclosure may further include a QR inserted along a center shaft of the fixing shaft in a longitudinal direction to fix the fixing shaft at a dropout of a bicycle frame.

A hub unit having a brake disk according to one form of the present disclosure may include a fixing shaft disposed along a rotation center shaft of a wheel; a hub body rotatably disposed at the fixing shaft through a bearing and having space inside in a circumference direction of the fixing shaft; a rotor fixed and disposed at an inner circumference surface of the hub body; a fixing member connected with the fixing shaft, extended toward a side of the rotor, where a stator facing the rotor is disposed on an end of portion of the fixing member; a brake disk fixed in the hub body and formed in a circumference direction on a basis of the fixing shaft; a caliper formed at the fixing member and an outside of the brake disk in a radial direction is inserted into the caliper; and a brake pad disposed at inside surface to be contacted with side surface of the brake disk.

An outer circumference surface of the hub body may be formed in a remote direction from the fixing member may be connected with a rim of a wheel by a spoke.

The rotor may be arranged by a predetermined interval in a rotation direction of the hub body, and the stator may be arranged by a predetermined interval in a rotation direction of the hub body corresponding to the rotor.

The rotor or the stator may be sequentially vitrified by supplied power to rotate the hub body on the basis of the fixing shaft through attraction or repulsion force between them.

In forms of the present disclosure, to achieve this purpose, a brake disk is disposed in a hub body and located at a center portion of a fixing shaft in a longitudinal direction, thus the hub unit prevents a disk from being bent according to braking motion by outside shock and fatal injury on human body and eliminates moment generated in one direction during braking of a front wheel to obtain stability of steering.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1, FIG. 2, FIG. 3, and FIG. 4 are schematic cross-sectional views of a hub unit having a brake disk.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Forms of the present disclosure will hereinafter be described in detail with reference to the accompanying drawings.

In the drawings, size and thickness of each element is approximately shown for better understanding and ease of description. Therefore, the present disclosure is not limited to the drawings, and the thicknesses of layers, films, panels, regions, etc., are exaggerated for clarity.

However, the drawings and description are to be regarded as illustrative in nature and not restrictive. Like reference numerals designate like elements throughout the specification.

The terms "first", "second" etc. in the following description is for discriminating the configurations because the names are the same and the present disclosure is not limited to the order.

FIG. 1 is a schematic cross-sectional view of a hub unit having a brake disk.

Referring to FIG. 1, a hub unit having a brake disk includes a fixing shaft 100, a sealing member 105, a bearing 110, a sprocket install portion 112, a hub body 115, a brake disk 120, a brake pad 125, and a caliper 130 as constituent elements.

The fixing shaft 100 is disposed along a rotation center shaft and fixed at a dropout of a bicycle frame by a QR (quick release). Here, engagement structures of the fixing shaft 100, QR and dropout are well-known technology and therefore a detailed description thereof will be omitted.

The hub body 115 and the sprocket install portion 112 are disposed on a same shaft with the fixing shaft 100, the fixing shaft 100 is disposed to penetrate a center portion of the hub body 115 and the sprocket install portion 112, and the hub body 115 is engaged with the sprocket install portion 112.

A sprocket (not shown) is disposed at the sprocket install portion 112, and the sprocket install portion 112 receives rotational force through the sprocket to rotate the hub body 115.

The hub body 115 is rotatably disposed at the fixing shaft 100 through the bearing 110, and the brake disk 120 is fixed at one end portion of the hub body 115. The brake disk 120 has a disk structure formed in a circumference direction of the hub body 115.

The caliper 130 is fixed at a bicycle frame (not shown), and an outer edge portion of the brake disk 120 is inserted into groove of the caliper 130. Further, the brake pad 125 is disposed at both inside surfaces of the caliper 130 to be contacted with the brake disk 120.

The brake disk 120 is disposed at an outside end portion of the hub body 115 and may be bent according to braking motion by outside shock. The disk 120 may be sharpened such as to cause fatal injury on human body, and a front wheel of the bicycle generates moment in one direction during braking to occur instability of steering.

In forms of the present disclosure, the brake disk 120 is disposed in a hub body 115 and located at a center portion of a fixing shaft 100 in a longitudinal direction. Thus, the hub unit prevents the disk from being bent according to braking motion by outside shock, reduces the chances of the disk causing a fatal injury on human body, and reduces or eliminates moment generated in one direction during braking of a front wheel to obtain stability of steering.

Figure 2:
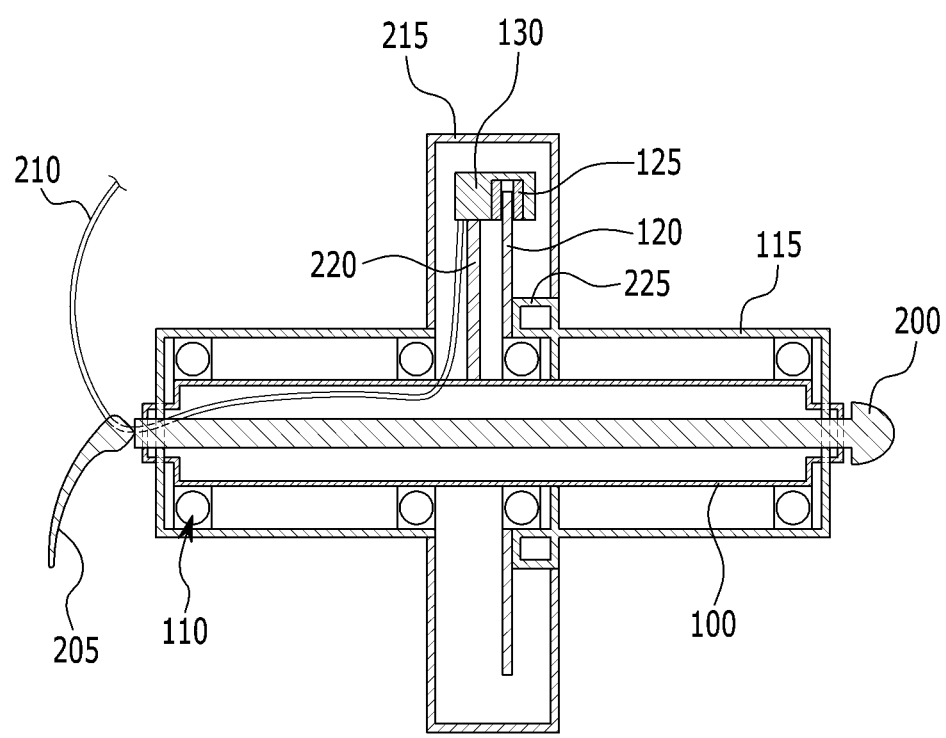

FIG. 2 is a schematic cross-sectional view of a hub unit having a brake disk according to one form of the present disclosure.

Referring to FIG. 2, a hub unit having a brake disk includes a QR 200, a fixing shaft 100, a bearing 110, a QR lever 205, a brake cable 210, a fixing member 220, a body expansion portion 215, a caliper 130, a brake pad 125, a brake disk 120, a bracket 225, and a hub body 115 as constituent elements.

The OR 200 is inserted along a center portion of the fixing shaft 100, the fixing shaft 100 is inserted along a center portion of the hub body 115, the bearing 110 is interposed between the fixing shaft 100 and the hub body 115, and the hub body 115 is rotatably disposed on the fixing shaft 100.

In one form of the present disclosure, a body expansion portion 215 of which an outer diameter becomes larger is formed at a center portion of the hub body 115 in a longitudinal direction, and the caliper 130, the brake disk 120 and the fixing member 220 are disposed in the body expansion portion 215.

One end of the fixing member 220 is fixed at the fixing shaft 100 and extended toward inside of the body expansion portion 215. The caliper 130 is fixed at the other end of the fixing member 220, and the brake pad 125 is disposed on inside both surfaces of groove of the caliper 130.

Edge close to the fixing shaft 100 is fixed at the hub body 115 through the bracket 225 in the brake disk 120, edge remote from the fixing shaft 100 is inserted into the groove of the caliper 130 in the brake disk 120, and the brake pad 125 contacts with the brake disk 120 according to operation of the brake lever (not shown).

The brake cable 210 is connected with the caliper 130 through the fixing shaft 100 and delivers operation force to the brake pad 125. Here, when a rider performs braking, the brake cable 210 uses hydraulic pressure of wire to deliver operation force to the brake pad 125.

In one form of the present disclosure, when the operation force is delivered through the brake cable 210, the brake pad 125 contacts on both surfaces of the brake disk 120 and the caliper 130 supplies braking force to the brake disk 120 with reference to the fixing shaft 100.

A rim of a wheel (not shown) is connected with the hub body 115 through a spoke, the rim, the hub body 115 and the brake disk 120 rotate together. When braking force is supplied to the brake disk 120, the braking force is delivered to a tire engaged at the rim.

Figure 3:
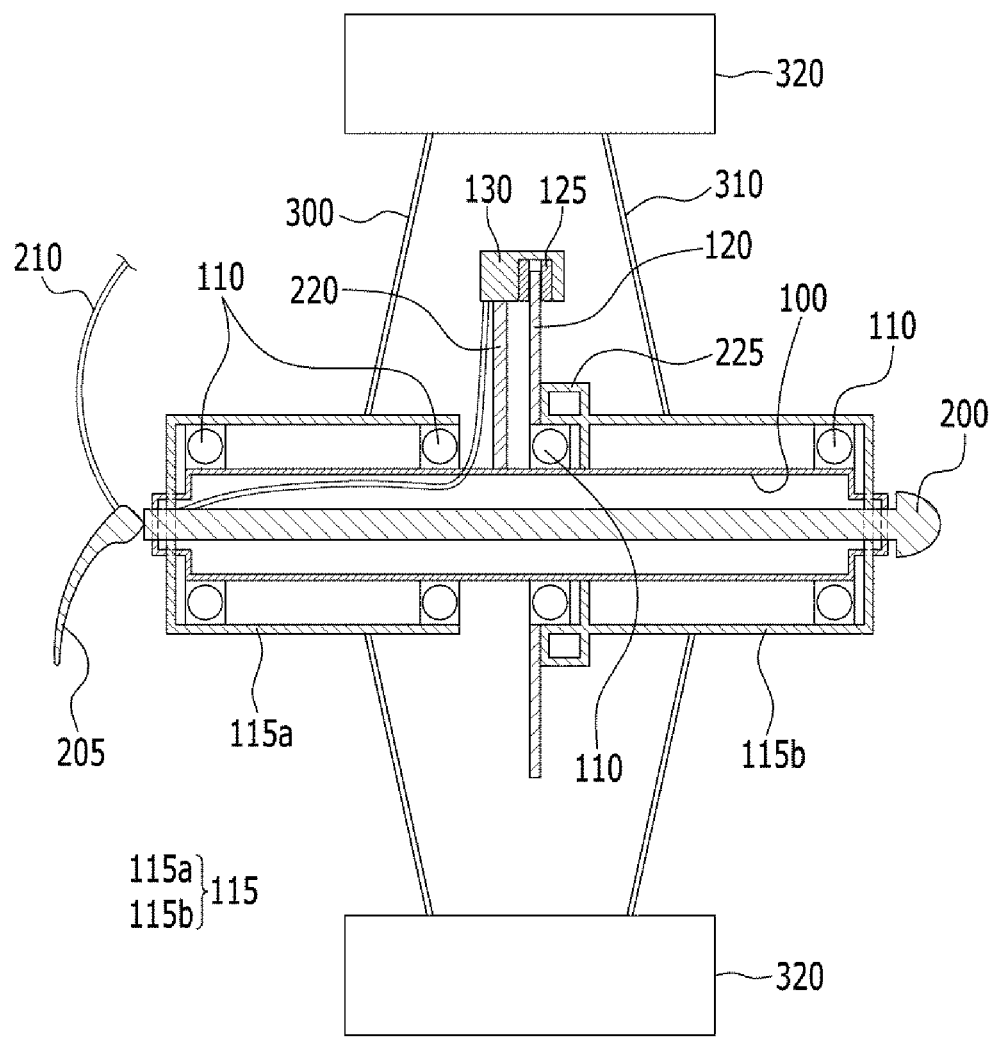

FIG. 3 is a schematic cross-sectional view of a hub unit having a brake disk according to another form of the present disclosure.

Referring to FIG. 3, a hub unit having a brake disk includes a QR lever 205, a first hub body 115a, a second hub body 115b, a bearing 110, a OR 200, a fixing shaft 100, a bracket 225, a first spoke 300, a brake disk 120, a brake pad 125, a caliper 130, a fixing member 220, and a second spoke 310 as constituent elements.

The hub body 115 includes the first hub body 115a and the second hub body 115b disposed in a predetermined interval in a longitudinal direction, the fixing shaft 100 penetrates along center shafts of the first and second hub bodies 115a and 115b, and the bearing 110 is interposed between the fixing shaft 100 and the hub body 115.

Further, the OR 200 is disposed penetrating the center portion of the fixing shaft 100, and the fixing shaft 100 is fixed at a dropout of a bicycle frame.

The brake disk 120 is fixed at an end portion opposing to the first hub body 115a by the bracket 225, and the brake disk 120 is formed in a rotation direction of the hub body 115.

The fixing member 220 is connected with and fixed at the fixing shaft 100 between the first and second hub bodies 115a and 115b, the caliper 130 is fixed at a front end portion of the outside of the fixing member 220, and outside edge of the brake disk 120 is inserted into the groove of the caliper 130.

Further, the brake pad 125 selectively contacting with the brake disk 120 to supply braking force is disposed inside of the groove of the caliper 130.

In one form of the present disclosure, one end of the first spoke 300 is connected with the first hub body 115a, the other end is connected with a rim of a wheel (not shown), one end of the second spoke 310 is connected with the second hub body 115b, and the other end is connected with the rim.

In one form of the present disclosure, when the operation force is delivered through the brake cable 210, the brake pad 125 contacts on both surfaces of the brake disk 120 and the caliper 130 supplies braking force to a tire (not shown) engaged with the rim through the brake disk 120, the second hub body 115b and the second spoke 310.

Figure 4:
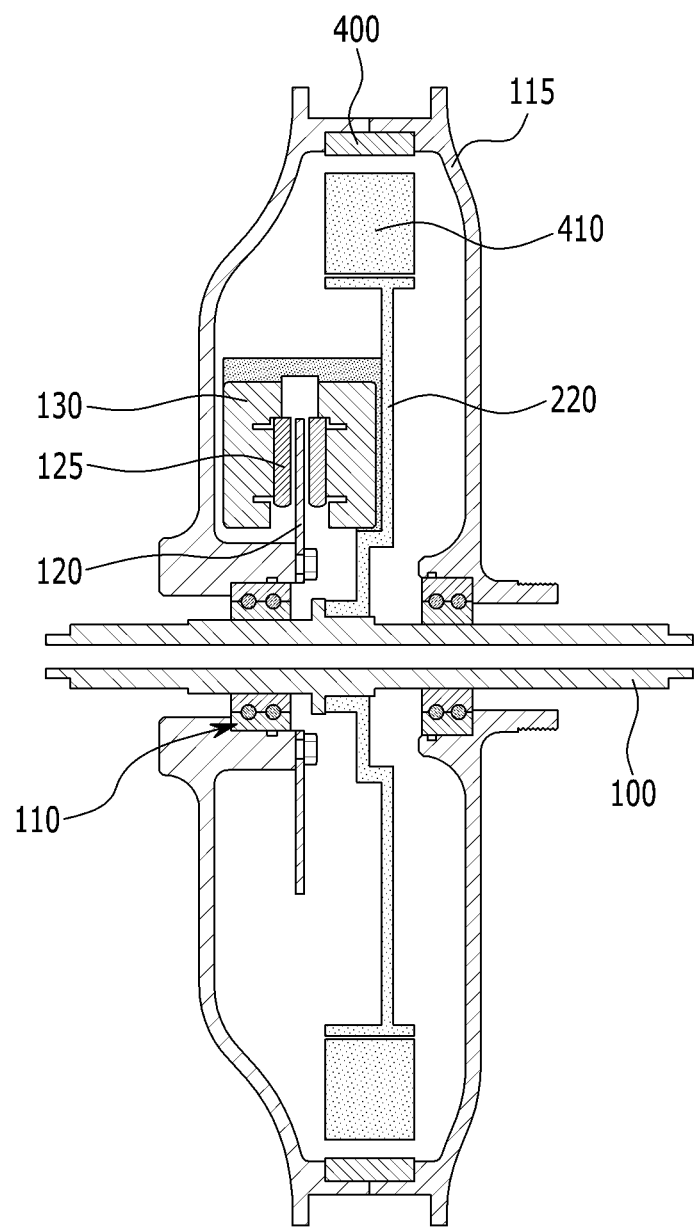

FIG. 4 is a schematic cross-sectional view of a hub unit having a brake disk according to another form of the present disclosure.

Referring to FIG. 4, a hub unit having a brake disk includes a fixing shaft 100, a fixing member 220, a stator 410, a hub body 115, a rotor 400, a caliper 130, a brake pad 125, a brake disk 120, and a bearing 110 as constituent elements.

A space is formed in the hub body 115, the fixing shaft 100 penetrates a rotation center portion of the hub body 115, and the bearing 110 is interposed between the hub body 115 and the fixing shaft 100.

The fixing shaft 100 is fixed at a frame by a fixing means, the hub body 115 is connected with a rim through a spoke, and a tire engaged at the hub body 115, the spoke and the rim rotates.

The fixing member 220, the stator 410, the rotor 400, the caliper 130, the brake pad 125 and the brake disk 120 are disposed in the hub body 115.

The brake disk 120 is fixed inside the hub body 115 through the fixing means, the center portion of the fixing member 220 is fixed at the fixing shaft 100 and extends in a radiation direction, and the stator 410 is fixed at the end portion of the fixing member 220.

The caliper 130 is fixed at the fixing member 220, the edge portion of the brake disk 120 is inserted into the groove of the caliper 130 and engaged at the caliper 130 such that the brake pad 125 selectively contacts with the brake disk 120.

The rotor 400 opposing to the stator 410 is arranged and fixed at an inner circumference surface of the hub body 115 in a rotation direction of the hub body 115.

When a predetermined power is supplied to the rotor 400 or the stator 410, the rotor 400 and the hub body 115 rotate with a motor magnetic force (by attraction or repulsion force) on a basis of the stator 410, therefore the rim and tire may rotate through the spoke.

In one form of the present disclosure, when the brake operates, the brake pad 125 contacts with both surfaces of the brake disk 120 in the caliper 130, and the caliper 133 supplies the tire (not shown) engaged at the rim through the brake disk 120, the hub body 115 and the spoke.

While this disclosure has been described in connection with what is presently considered to be practical forms, it is to be understood that the disclosure is not limited to the disclosed forms of the present disclosure. On the contrary, it is intended to cover various modifications and equivalent arrangements included within the spirit and scope of the appended claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A hub unit having a brake disk comprising:
a fixing shaft disposed along a rotation center shaft;
a hub body rotatably disposed at the fixing shaft through a bearing, the hub body having space inside;
a brake disk fixed in the hub body by a bracket and formed in a circumference direction on a basis of the fixing shaft;
a fixing member formed to extend toward a vertical direction to a lengthwise direction of the fixing shaft, wherein one side of the fixing member is fixed to the fixing shaft;
a caliper formed at the other side of the fixing member, wherein a part of the brake disk is inserted into the caliper; and
a brake pad, wherein both inside surfaces of the brake pad are configured to contact with both side surfaces of the brake disk,
wherein a body expansion portion is formed at the hub body, and an outer diameter of the body expansion portion is capable of becoming larger, and
the caliper is disposed inside the body expansion portion, and wherein one end of the fixing member is fixed to the fixing shaft,
the other end of the fixing member extends toward outside in a radial direction in the body expansion portion, and
the brake disk is disposed in parallel with the fixing member and extends toward inside of the caliper.

2. The hub unit of claim 1, wherein:
the body expansion portion and the fixing member are formed at a center portion of the fixing shaft in a longitudinal direction.

3. The hub unit of claim 1, further comprising:
a quick release (QR) inserted along a center shaft of the fixing shaft in a longitudinal direction, wherein the QR is configured to fix the fixing shaft to a dropout of a bicycle frame.

4. The hub unit of claim 1, wherein:
the bearing is interposed between an inner circumference surface of the hub body and an outer circumference surface of the fixing shaft.

5. A hub unit having a brake disk comprising:
a fixing shaft disposed along a rotation center shaft;
a first hub body rotatably disposed at one side of the fixing shaft through a bearing;
a second hub body rotatably disposed at the other side of the fixing shaft through the bearing in a predetermined interval with the first hub body;
a brake disk fixed in an end portion of the second hub body opposing to an end portion of the first hub body, wherein the brake disk is formed in a circumference direction on a basis of the fixing shaft;
a fixing member formed to extend toward a vertical direction to a lengthwise direction of the fixing shaft, wherein one end of the fixing member is connected to the fixing shaft and extended in a predetermined distance toward outside in a radial direction between the first hub body and the second hub body;
a caliper formed at an outside end portion of the fixing member, wherein the brake disk is inserted into the caliper; and
a brake pad, wherein both inside surfaces of the brake pad are configured to contact with both side surfaces of the brake disk,
wherein the brake disk is disposed in parallel with the fixing member and extends toward inside of the caliper.

6. The hub unit of claim 5, wherein:
the first hub body is disposed at one side on a basis of the brake disk and connected to one end portion of a first spoke, wherein the first spoke is connected to a rim of a wheel, and
the second hub body is disposed at the other side on the basis of the brake disk and connected to a second spoke, wherein the second spoke is connected to the rim of the wheel.

7. The hub unit of claim 5, further comprising:
a QR inserted along a center shaft of the fixing shaft in a longitudinal direction, wherein the QR is configured to fix the fixing shaft to a dropout of a bicycle frame.

8. A hub unit having a brake disk comprising:
a fixing shaft disposed along a rotation center shaft of a wheel;
a hub body rotatably disposed at the fixing shaft through a bearing, the hub body having space inside in a circumference direction of the fixing shaft;
a rotor fixed and disposed at an inner circumference surface of the hub body;
a fixing member connected to the fixing shaft and extended toward a side of the rotor and formed to extend toward a vertical direction to a lengthwise direction of the fixing shaft, wherein a stator facing the rotor is disposed on an end portion of the fixing member;
a brake disk fixed in the hub body and formed in a circumference direction on a basis of the fixing shaft;
a caliper formed at the fixing member, wherein an outside of the brake disk in a radial direction is inserted into the caliper; and
a brake pad, wherein inside surface of the brake pad is configured to contact with side surface of the brake disk,
wherein the brake disk is disposed in parallel with the fixing member and extends toward inside of the caliper.

9. The hub unit of claim 8, wherein:
an outer circumference surface of the hub body formed in a remote direction from the fixing member is connected to a rim of a wheel by a spoke.

10. The hub unit of claim 8, wherein:
the rotor is arranged by a predetermined interval in a rotation direction of the hub body, and
the stator is arranged by a predetermined interval in the rotation direction of the hub body corresponding to the rotor.

11. The hub unit of claim 8, wherein:
the rotor or the stator is sequentially vitrified by supplied power configured to rotate the hub body on the basis of the fixing shaft through attraction or repulsion force between them.

* * * * *